(12) United States Patent
Shen et al.

(10) Patent No.: US 9,876,733 B2
(45) Date of Patent: Jan. 23, 2018

(54) RESOURCE RESERVATION METHOD AND SYSTEM, AND CONVERGENCE DEVICE

(71) Applicant: Huawei Technologies Co., Ltd., Shenzhen, Guangdong (CN)

(72) Inventors: Chenghu Shen, Shenzhen (CN); Dao Pan, Johannesburg (ZA); Yong Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 14/748,448

(22) Filed: Jun. 24, 2015

(65) Prior Publication Data

US 2015/0295847 A1  Oct. 15, 2015

Related U.S. Application Data

(63) Continuation of application No. PCT/CN2013/090273, filed on Dec. 24, 2013.

(30) Foreign Application Priority Data

Dec. 24, 2012 (CN) .......................... 2012 1 0566436

(51) Int. Cl.
*H04L 12/911* (2013.01)
*H04L 29/06* (2006.01)
(Continued)

(52) U.S. Cl.
CPC ............ *H04L 47/72* (2013.01); *H04H 60/97* (2013.01); *H04L 12/2801* (2013.01);
(Continued)

(58) Field of Classification Search
CPC ................................ H04L 47/00; H04L 69/00
See application file for complete search history.

(56) References Cited

U.S. PATENT DOCUMENTS

2002/0062485 A1* 5/2002 Okano ................ H04L 29/1282
                                                                    725/111
2008/0123543 A1*  5/2008 Do ........................ H04W 12/06
                                                                    370/252
(Continued)

FOREIGN PATENT DOCUMENTS

CN          1747467 A       3/2006
CN        101997725 A       3/2011
(Continued)

OTHER PUBLICATIONS

"PacketCable Specification, Multimedia Specification", Cable Television Laboratories, Inc., 2003-2009, 157 pages.
(Continued)

*Primary Examiner* — Andrew Lai
*Assistant Examiner* — Sumitra Ganguly

(57) ABSTRACT

Embodiments of the present invention relate to the field of communications technologies, and disclose a resource reservation method and system, and a convergence device. The method includes: receiving, by a convergence device, a first resource reservation request message based on a format of a first interface and that is from a policy server (PS); converting, by the convergence device, the first resource reservation request message into a second resource reservation request message based on a format of a second interface; and sending, by the convergence device, the second resource reservation request message based on the format of the second interface to a modulation and demodulation system, so that the modulation and demodulation system performs resource reservation according to the second resource reservation request message.

11 Claims, 12 Drawing Sheets

(51) Int. Cl.
*H04H 60/97* (2008.01)
*H04L 12/28* (2006.01)
*H04N 7/10* (2006.01)
*H04L 12/24* (2006.01)

(52) U.S. Cl.
CPC ...... *H04L 12/2859* (2013.01); *H04L 41/0893* (2013.01); *H04L 69/08* (2013.01); *H04N 7/106* (2013.01); *H04L 41/0896* (2013.01)

(56) References Cited

U.S. PATENT DOCUMENTS

| | | | |
|---|---|---|---|
| 2008/0256237 A1* | 10/2008 | Liu | H04L 47/72 709/226 |
| 2010/0157814 A1* | 6/2010 | Ha | H04W 28/24 370/242 |
| 2010/0290366 A1 | 11/2010 | Garcia | |
| 2011/0299390 A1 | 12/2011 | Liu | |
| 2012/0257891 A1* | 10/2012 | Boyd | H04L 47/6215 398/45 |
| 2013/0115889 A1* | 5/2013 | Libin | H04W 72/0406 455/67.11 |
| 2014/0029462 A1* | 1/2014 | Stewart | H04L 43/06 370/252 |
| 2015/0046966 A1 | 2/2015 | Sheng et al. | |

FOREIGN PATENT DOCUMENTS

| | | | |
|---|---|---|---|
| CN | 102624560 A | 8/2012 | |
| CN | 102739514 A | 10/2012 | |
| EP | 1 655 923 A2 | 5/2006 | |
| EP | 1 718 006 A1 | 11/2006 | |
| EP | 2 262 170 A1 | 12/2010 | |
| EP | 2 827 531 A1 | 1/2015 | |

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 11)", 3GPP TS 24.229 V11.6.0, Dec. 2012, 777 pages.

"PacketCable 1.5 Specifications, Dynamic Quality-of-Service", Cable Television Laboratories, Inc., 2004-2009, 98 pages.

D. Durham, Ed., et al., "The COPS (Common Open Policy Service) Protocol", Jan. 2000, 38 pages.

"Implementors' Guide for the H.248 Sub-series of Recommendations ("Media Gateway Control Protocol")", ITU-T H.248 Sub-series Implementors' Guide, May 8, 2008, 52 pages.

Dinesh G. Dutt, et al., "COPS Extensions for RSVP Receiver Proxy", Internet Draft, Jul. 1, 2001, 5 pages.

"PacketCable Dynamic Quality-of-Service Specification", Cable Television Laboratories, Inc., Nov. 27, 2002, 212 pages.

"Data-Over-Cable Interface Specifications C-DOCSIS, C-DOCSIS System Specification", Aug. 29, 2014, 91 pages.

Karthik Sundaresan, "CableLabs Technology Adopted by China's Cable Operators (C-DOCSIS)", CableLabs, Jan. 1, 2015, 2 pages.

"PacketCable Specification, Multimedia Specification", Cable Television Laboratories, Inc., May 28, 2008, 144 pages.

* cited by examiner

RESOURCE RESERVATION METHOD AND SYSTEM, AND CONVERGENCE DEVICE

CROSS-REFERENCE TO RELATED APPLICATIONS

This application is a continuation of International Application No. PCT/CN2013/090273, filed on Dec. 24, 2013, which claims priority to Chinese Patent Application No. 201210566436.8, filed on Dec. 24, 2012, both of which are hereby incorporated by reference in their entireties.

TECHNICAL FIELD

The present invention relates to the field of communications technologies, and specifically, to a resource reservation method and system, and a convergence device.

BACKGROUND

DOCSIS (Data Over Cable Service Interface Specification, data over cable service interface specification) is a communications standard that allows high-speed data transmission in an existing Cable TV network system. As shown in FIG. 1, a network to which a DOCSIS technology is applied mainly includes two types of devices: a CMTS (Cable Modem Termination Systems, cable modem terminal system) and a CM (Cable Modem, cable modem), where the CMTS is a large-scale device connected to a wide area network and may support more than ten thousands of subscribers, the CM is located on a remote subscriber side and is connected to a home network, and the CMTS and the CM are connected by using an HFC (Hybrid Fiber-Coaxial, hybrid fiber coaxial) network. The DOCSIS standard primarily supports implementation of IP data packet transmission between the CMTS and the CM.

During network data transmission, some real-time services (such as a voice service and a video service) have a relatively high requirement on quality of service (QoS, Quality of Service) of a network. On an existing DOCSIS network, DQoS (Dynamic Quality of Service, dynamic QoS) guarantee on the network is implemented by using some technical measures, for example, a PacketCable standard defined by CableLabs, where the PacketCable standard may implement dynamic QoS guarantee between a CMTS and a CM. An involved architecture and an involved interface, as shown in FIG. 2, include a UE (User equipment, user equipment), a CM, a CMTS, a PS (Policy Server, policy server), an AM (Application Manager, application manager), a P-CSCF (Proxy Call Session Control Function, proxy call session control function); in the PacketCable standard, different interfaces are used between the P-CSCF, the AM, the PS, the CMTS, the CM, and the UE. The following are specific descriptions of several types of involved interfaces:

| Interface name | Connected network elements | Description |
| --- | --- | --- |
| pkt-mm-1 | CMTS-CM | The CMTS sends a DOCSIS-defined DSX message to the CM by using the pkt-mm-1 interface, to control the CM to add, delete, or change a DOCSIS service flow (service flow) to dynamically implement a QoS request. |
| pkt-mm-2 | PS-CMTS | The PS uses this interface to deliver a QoS policy to the CMTS; the CMTS uses this interface to report a QoS policy processing result. |
| pkt-mm-3 | AM-PS | The AM uses this interface to instruct the PS to deliver a QoS policy to the CMTS; the PS uses this interface to notify the AM of a result of processing, by the CMTS, the QoS policy. |
| Gm | UE-P-CSCF | The UE and the P-CSCF implement registration and session control by using this interface. |
| Rx | P-CSCF-AM | The P-CSCF and the AM implement session policy control and QoS resource information exchange by using this interface. |
| pkt-qos-2 | PS-CMTS | The PS uses this interface to determine a CMTS connected to the UE device, where the interface uses the CPD (Control Point Discovery) protocol. |

In an existing DOCSIS network architecture, establishing a session that requires resource reservation generally includes the following procedure:

Step S1: An AM receives a request, sent by a P-CSCF, for performing resource reservation for a to-be-established session.

When a subscriber end initiates a request for a session that requires resource reservation, a call server of the session instructs, by using the P-CSCF, the AM to perform resource reservation for the foregoing session.

Step S2: The AM transmits a Gate-Set resource reservation request message to a PS, where the Gate-Set resource reservation request message includes a QoS parameter and a packet flow classification parameter.

Step S3: After receiving the Gate-Set resource reservation request message, the PS converts the Gate-Set resource reservation request message, and then forwards a Gate-Set resource reservation request message obtained by the conversion to a CMTS.

Step S4: The CMTS sends a dynamic service addition request DSA-REQ to a CM after receiving the Gate-Set resource reservation request message.

Step S5: The CM receives the foregoing service addition request DSA-REQ, adds a service flow (service flow) to respond to the service addition request, and replies to the CMTS with a dynamic service addition response DSA-RSP.

Step S6: The CMTS replies to the CM with a dynamic service addition acknowledgement DSA-ACK.

Step S7: The CMTS sends a Gate-Set-ACK resource reservation acknowledgement message to the PS.

Step S8: The PS sends the resource reservation response message to the AM.

Step S9: The AM receives a resource activation request that is sent by a session server by using application layer signaling.

After local resource reservation of the subscriber end is complete, a session server at an application layer initiates a connection request to a peer end of the session; after the peer end receives a session request, the session server instructs, by using the P-CSCF, the AM to activate a resource reserved for the session.

Step S10: The AM transmits a Gate-Set resource activation request message to the PS, where the Gate-Set resource activation request message includes a QoS parameter and a packet flow classification parameter.

Step S11: After receiving the Gate-Set resource activation request message, the PS converts the Gate-Set resource activation request message, and then forwards a Gate-Set resource activation request message obtained by the conversion to the CMTS.

Step S12: The CMTS sends a dynamic service change request DSC-REQ to the CM after receiving the Gate-Set resource activation request message.

Step S13: The CM receives the foregoing dynamic service change request DSC-REQ, changes an attribute of a service flow to an activated state, and replies to the CMTS with a dynamic service change response DSC-RSP.

Step S14: The CMTS replies to the CM with a dynamic service change acknowledgement DSC-ACK.

Step S15: The CMTS sends a Gate-Set-ACK resource activation response message to the PS.

Step S16: The PS sends the resource activation response message to the AM.

So far, QoS resource reservation and activation that are required during a session of a subscriber end are implemented, and the subscriber end can start a session interaction process.

With increasing requirements of subscribers on data services, to increase data bandwidth of a subscriber, a DOCSIS-based C-DOCSIS (China DOCSIS) technology emerges. As shown in FIG. 3, compared with a conventional network architecture in a DOCSIS technology, in a network architecture in the C-DOCSIS technology, a CMTS is moved down from a Hub equipment room to an optical node, and a quantity of subscribers served by the CMTS is reduced. A CMTS in this form is also referred to as a CMC (Cable Media Converter, cable media converter). An advantage of this type of network architecture lies in that, after the CMTS is moved down, supported subscribers are reduced, and larger bandwidth may be provided for each subscriber. After the CMTS is moved down to the optical node, a quantity of CMTSs is greatly increased, and a convergence device needs to be added to a network to converge the CMTSs located on optical nodes, where the convergence device may be a device such as an OLT (optical line terminal, optical line terminal), a switch, or a router. Generally, one convergence device may be connected to tens of or more CMTSs.

When an original dynamic QoS mechanism defined in PacketCable is applied to a C-DOCSIS network, some problems may occur:

On an original DOCSIS network, one CMTS may support at most tens of thousands of subscribers, and in this case, only hundreds of or less CMTS devices are required for serving ten million subscribers. However, on a C-DOCSIS network, because a CMTS device is moved down and one CMTS device generally supports only hundreds of or less subscribers, a large quantity of CMTS/CMC devices are required on the C-DOCSIS network, but a device implementing a Policy Server function generally supports only a relatively small quantity of CMTS devices (for example, 256 CMTS devices) for consideration of implementation complexity, capacity, and the like, and the large quantity of CMTS/CMC devices on the C-DOCSIS network can hardly be supported. Therefore, a resource reservation method applicable to the original DOCSIS network cannot be properly applied to the C-DOCSIS network.

SUMMARY

Technical problems to be solved in the embodiments of the present invention are to provide a resource reservation method and system, and a convergence device, so as to implement resource reservation on a network.

An embodiment of the present invention provides a resource reservation method, including:
  receiving, by a convergence device, a first resource reservation request message that is based on a format of a first interface and that is from a policy server PS;
  converting, by the convergence device, the first resource reservation request message into a second resource reservation request message that is based on a format of a second interface; and
  sending, by the convergence device, the second resource reservation request message that is based on the format of the second interface to a modulation and demodulation system, so that the modulation and demodulation system performs resource reservation according to the second resource reservation request message.

Correspondingly, an embodiment of the present invention further provides a resource reservation system, including a policy server PS, a convergence device, and a modulation and demodulation system, where the convergence device is connected to the PS by using a first interface, the convergence device is connected to the modulation and demodulation system by using a second interface;
  the convergence device is configured to: receive a first resource reservation request message from the PS by using the first interface; convert the first resource reservation request message into a second resource reservation request message that is based on a format of the second interface; and send the second resource reservation request message to the modulation and demodulation system by using the second interface; and
  the modulation and demodulation system is configured to perform resource reservation according to the second resource reservation request message.

Correspondingly, an embodiment of the present invention further provides a convergence device, including:
  a first interface, configured to receive a first resource reservation request message from a policy server PS;
  a DQoS Proxy module, configured to convert the first resource reservation request message that is based on a format of the first interface into a second resource reservation request message that is based on a format of a second interface; and
  the second interface, configured to send the second resource reservation request message to a modulation and demodulation system, so that the modulation and demodulation system performs resource reservation according to the second resource reservation request message.

The present invention provides a resource reservation method and system, and a convergence device, where the convergence device is connected to a PS and a modulation and demodulation system, so that the convergence device receives and converts a resource reservation request message delivered by the PS, and then sends a resource reservation request message obtained through conversion to the modulation and demodulation system, so that the modulation and demodulation system controls a service flow by using a control message, to meet a requirement of the resource reservation request. The convergence device plays a role as a dynamic QoS proxy between the PS and the modulation and demodulation system; and on a network, a quantity of convergence devices is smaller than a quantity of CMTSs, and the PS needs to manage only the smaller quantity of convergence devices, thereby solving a problem regarding resource reservation on a C-DOCSIS network.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention provide a resource reservation method and system, so as to implement resource reservation on a C-DOCSIS network. The method and the system are separately described in the following:

Method Embodiment 1

Figure 4:
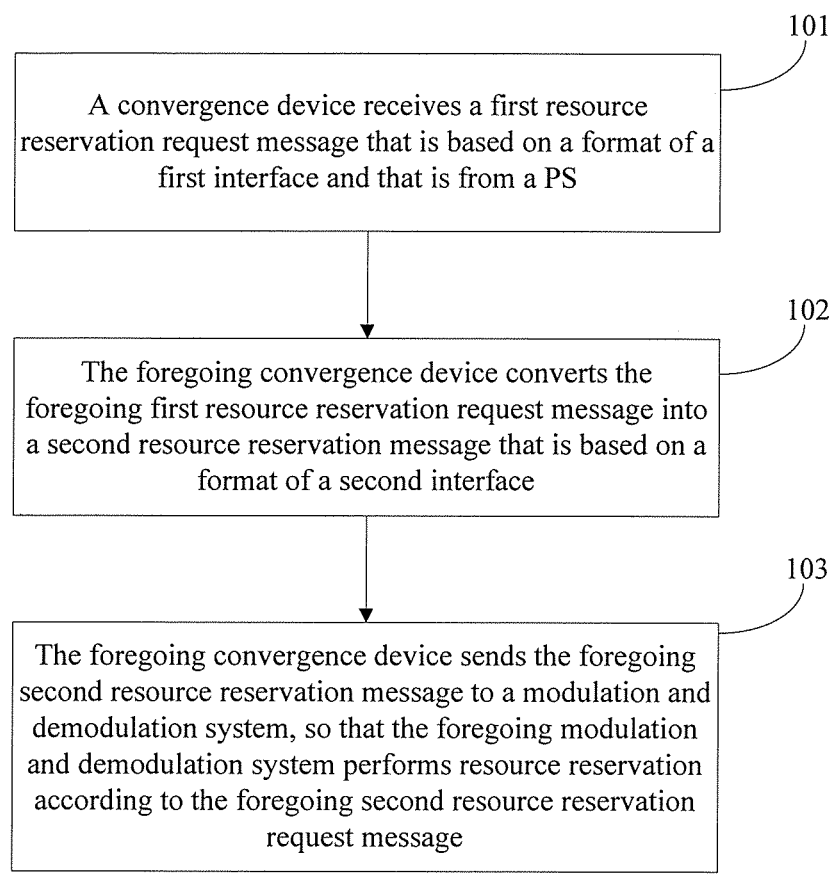
FIG. 4 is a schematic flowchart of a resource reservation method according to method embodiment 1.

Referring to FIG. 4, the present invention provides a resource reservation method, including:

101: A convergence device receives a first resource reservation request message that is based on a format of a first interface and that is from a PS.

In this embodiment, the foregoing format of the first interface may be pkt-mm-2.

102: The foregoing convergence device converts the foregoing first resource reservation request message into a second resource reservation request message that is based on a format of a second interface.

In this embodiment, the foregoing format of the second interface may be pkt-mm-2'.

103: The foregoing convergence device sends the foregoing second resource reservation message to a modulation and demodulation system, so that the foregoing modulation and demodulation system performs resource reservation according to the foregoing second resource reservation request message.

In this embodiment, the second resource reservation request message includes a resource reservation request, and the modulation and demodulation system may obtain, by means of parsing, the resource reservation request included in the second resource reservation message, and control a service flow by using a control message, so as to respond to the foregoing resource reservation request.

In this embodiment, the convergence device plays a role as a dynamic QoS proxy between the PS and the modulation and demodulation system. Because one convergence device may be connected to multiple modulation and demodulation systems (there may be tens of modulation and demodulation systems), a quantity of convergence devices on a network is relatively small, and the PS needs to manage only a relatively small quantity of convergence devices, thereby facilitating implementation of resource reservation on a network.

Further, the foregoing modulation and demodulation system may include a CMTS and a CM, or a CMC and a CM, where the CMTS is connected to the convergence device, and the CM is connected to the CMTS; or the CMC is connected to the convergence device, and the CM is connected to the CMC. In the embodiments of the present invention, each CMTS may be replaced with a CMC, and details are not described again in the following embodiments. Refer to the following embodiments.

Method Embodiment 2

Figure 5:
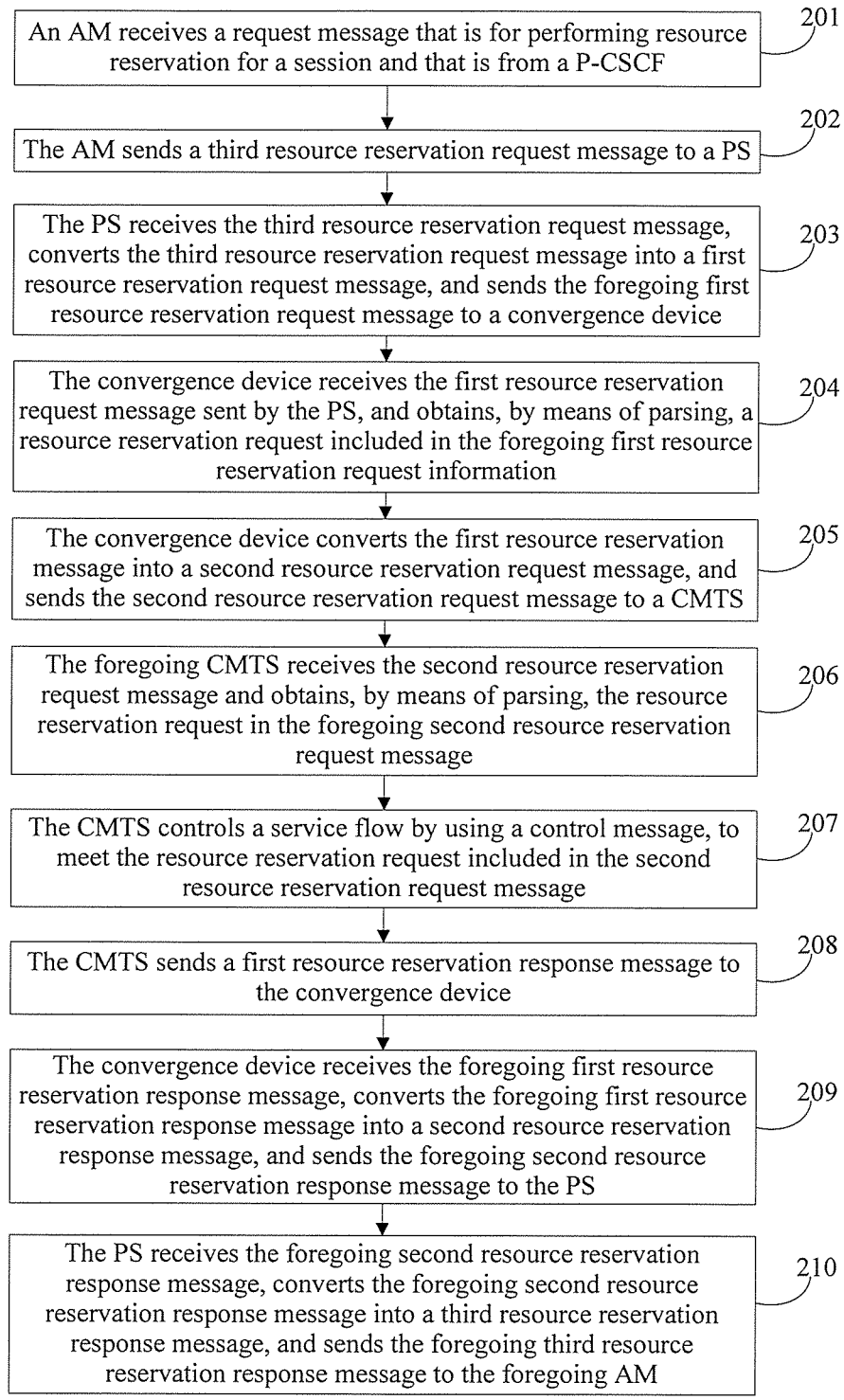
FIG. 5 is a schematic flowchart of a resource reservation method according to method embodiment 2.

Referring to FIG. 5, the present invention provides a resource reservation method, including:

201: An AM receives a request message that is for performing resource reservation for a session and that is from a P-CSCF.

When a subscriber end needs to establish a session, and initiates a session request to the P-CSCF by using a Gm interface, the P-CSCF instructs, by using an Rx interface, the AM to perform resource reservation for the foregoing session.

When the subscriber end needs to end the session, and initiates a session termination request to the P-CSCF by using the Gm interface, the P-CSCF instructs, by using the Rx interface, the AM to release a resource occupied by the foregoing session.

After receiving the request message, the AM parses the request message to determine a QoS resource required by the session or a QoS resource occupied by the session, and generates a third resource reservation request message.

202: The foregoing AM sends a third resource reservation request message to a PS by using a pkt-mm-3 interface, where the foregoing third resource reservation request message includes a resource reservation request corresponding to the foregoing request information.

In this embodiment, communication between the AM and the PS is performed by using the pkt-mm-3 interface, and therefore the foregoing third request message is a message based on the pkt-mm-3 interface.

203: The PS receives the foregoing third resource reservation request message by using the pkt-mm-3 interface, converts the foregoing third resource reservation request message into a first resource reservation request message, and sends the foregoing first resource reservation request message to a convergence device.

204: The convergence device receives, by using a pkt-mm-2 interface, the first resource reservation request message sent by the PS, and obtains, by means of parsing, the resource reservation request included in the foregoing first resource reservation request information.

In this embodiment, communication between the convergence device and the PS is performed by using the pkt-mm-2 interface, and therefore the foregoing first resource reservation request message is a message based on the pkt-mm-2 interface, and the first resource reservation message includes the resource reservation request.

205: The convergence device converts the foregoing first resource reservation message into a second resource reservation request message, and sends the foregoing second resource reservation request message to a CMTS.

In this embodiment, communication between the convergence device and the CMTS is performed by using a pkt-mm-2' interface, and therefore the convergence device converts the first resource reservation request message that is based on the pkt-mm-2 interface into the second resource reservation request message that is based on the pkt-mm-2' interface.

The following explains the pkt-mm-2' interface, and a pkt-mm-2' interface in another embodiment of the present invention is consistent with the pkt-mm-2' interface in this embodiment.

A COPS (Common Open Policy Service, common open policy service) connection is established between the PS and the convergence device. Between the PS and the convergence device, the PS is used as a server end of the COPS connection, the convergence device is used as a client of the COPS, and the PS regards the convergence device as a CMTS. A COPS connection is also established between the convergence device and a CMTS subordinate to the convergence device. Between the convergence device and the CMTS, the convergence device is used as a server end of the COPS connection, the CMTS is used as a client of the COPS, and the CMTS regards the convergence device as a PS. Status and handshake information of the COPS between the PS and the convergence device need to be transferred only between the PS and the convergence device; status and handshake information of the COPS between the convergence device and the CMTS need to be transferred only between the PS and the convergence device; request and response messages related to resource reservation need to be exchanged between the PS and the CMTS by using the convergence device. The pkt-mm-2 interface between the PS and the convergence device is consistent with that defined in a Packetcable standard, and the PS regards the convergence device as a CMTS. The pkt-mm-2' interface between the convergence device and the CMTS is consistent with a pkt-mm-2 interface in the PacketCable standard, the CMTS regards the convergence device as a PS; in order to be distinguished from the pkt-mm-2 interface between the PS and the convergence device, the interface between the convergence device and the CMTS is marked as pkt-mm-2'. A pkt-mm-2 interface message and a pkt-mm-2' interface message are both carried by using a COPS protocol packet.

The request and response messages, between the PS and the CMTS, related to the resource reservation need to be forwarded by the convergence device. Content of a pkt-mm-2' interface message and content of a pkt-mm-2 interface message are the same, except that source IP addresses and destination IP addresses of packets differ. The convergence device implements conversion between a pkt-mm-2' interface message and a pkt-mm-2 interface message.

A specific process in which the convergence device implements conversion between a pkt-mm-2' interface message and a pkt-mm-2 interface message is as follows:

when receiving a pkt-mm-2 interface message from the PS, the convergence device acquires IP address (Subscriber Identifier, IP address corresponding to a UE) information of a subscriber in the received packet, and searches for a CMTS corresponding to the convergence device according to an IP address of the subscriber; the convergence device replaces a destination IP address (this IP address is an IP address of the convergence device) in the received packet with an IP address of the corresponding CMTS, replaces a source IP address (this address is an IP address of the PS) in the packet with the IP address of the convergence device, and then forwards the packet to the corresponding CMTS; and when receiving a pkt-mm-2' interface message from the CMTS, the convergence device replaces a destination IP address (this IP address is the IP address of the convergence device) in the received packet with the IP address of the PS, replaces a source IP address (this address is the IP address of the CMTS) in the packet with the IP address of the convergence device, and then forwards the packet to the PS.

By means of the foregoing processing, the convergence device implements conversion between the pkt-mm-2 interface message and the pkt-mm-2' interface message.

In order to implement distribution of the message received from the PS to the corresponding CMTS for processing, the convergence device needs to maintain a relationship between the UE and the CMTS; when the UE dynamically acquires an IP address by using the DHCP (Dynamic Host Configuration Protocol, Dynamic Host Configuration Protocol), the convergence device records the IP address and the corresponding CMTS. In this way, the corresponding CMTS may be found according to the IP address of the UE.

A CPD (Control Point Discovery, control point discovery) connection may also be established between the convergence device and the PS and is corresponding to a pkt-qos-2 interface, that is, a pkt-qos-2 interface that is between a PS and a CMTS and that is defined in the PacketCable standard, and the PS regards the convergence device as a CMTS. When the PS receives a request message related to resource reservation, if a corresponding CMTS cannot be found according to IP address (Subscriber Identifier, IP address corresponding to a UE) information of a subscriber in the resource reservation request message, the PS sends a CPD request message, where a destination IP address in the message is an IP address of the subscriber. After the convergence device receives the message, if the subscriber is located on a CMTS connected to the convergence device, and the convergence device has recorded, when the subscriber goes online, the IP address of the subscriber, the convergence device fills related information, for example, an IP address of the convergence device, in a CPD response message, and sends the CPD response message to the PS. After acquiring the response message, the PS obtains the CMTS (that is, the foregoing convergence device) corresponding to the subscriber, and sends the resource reservation request message to the corresponding CMTS (that is, the foregoing convergence device).

206: The foregoing CMTS receives the foregoing second resource reservation request message by using a pkt-mm-2' interface and obtains, by means of parsing, the resource reservation request in the foregoing second resource reservation request message.

207: The CMTS configures a service flow by using a control message, to meet the resource reservation request included in the foregoing second resource reservation request message.

Specifically, the CMTS adds, activates (corresponding to session establishment), or deletes (corresponding to session termination) a dynamic service flow between the CMTS and the CM according to the foregoing resource reservation request by using the control message, so as to respond to the foregoing resource reservation request.

Specifically, the foregoing control message is a DSX message, where DSx messages may include three types of messages: a DSA (Dynamic Service Addition) message that is used for adding a dynamic service flow between the CMTS and the CM; a DSC (Dynamic Service Change) message that is used for changing (activating) a service flow between the CMTS and the CM; and a DSD (Dynamic Service Deletion) message that is used for deleting a dynamic service flow between the CMTS and the CM.

208: The CMTS sends a first resource reservation response message to the convergence device.

After a requirement of the foregoing resource reservation request is met, the CMTS generates the first resource reservation response message, and sends the first resource reservation response message to the convergence device. Communication between the CMTS and the convergence device is performed by using the pkt-mm-2' interface, and therefore the first resource reservation response message is a message based on the pkt-mm-2' interface.

209: The convergence device receives the foregoing first resource reservation response message, converts the foregoing first resource reservation response message into a second resource reservation response message, and sends the foregoing second resource reservation response message to the PS.

Communication between the convergence device and the PS is performed by using the pkt-mm-2 interface, and therefore the convergence device converts a first acknowledgement message into a second acknowledgement message that is based on the pkt-mm-2 interface.

210: The foregoing PS receives the foregoing second resource reservation response message, converts the foregoing second resource reservation response message into a third resource reservation response message, and sends the foregoing third resource reservation response message to the foregoing AM.

Communication between the PS and the AM is performed by using the pkt-mm-3 interface, and therefore the PS converts the second resource reservation response message into the third resource reservation response message that is based on the pkt-mm-3 interface.

After receiving the foregoing third resource reservation response message, the AM may notify, by using a response message, the P-CSCF that the resource reservation process is complete, where the response message is a response to the request message, received by the AM in step 201, for performing resource reservation for a session.

After the resource reservation between the CMTS and the CM is complete, the reserved resource still needs to be activated if session establishment is to be completed, which is described in detail in the following.

Method Embodiment 3

Figure 6A:
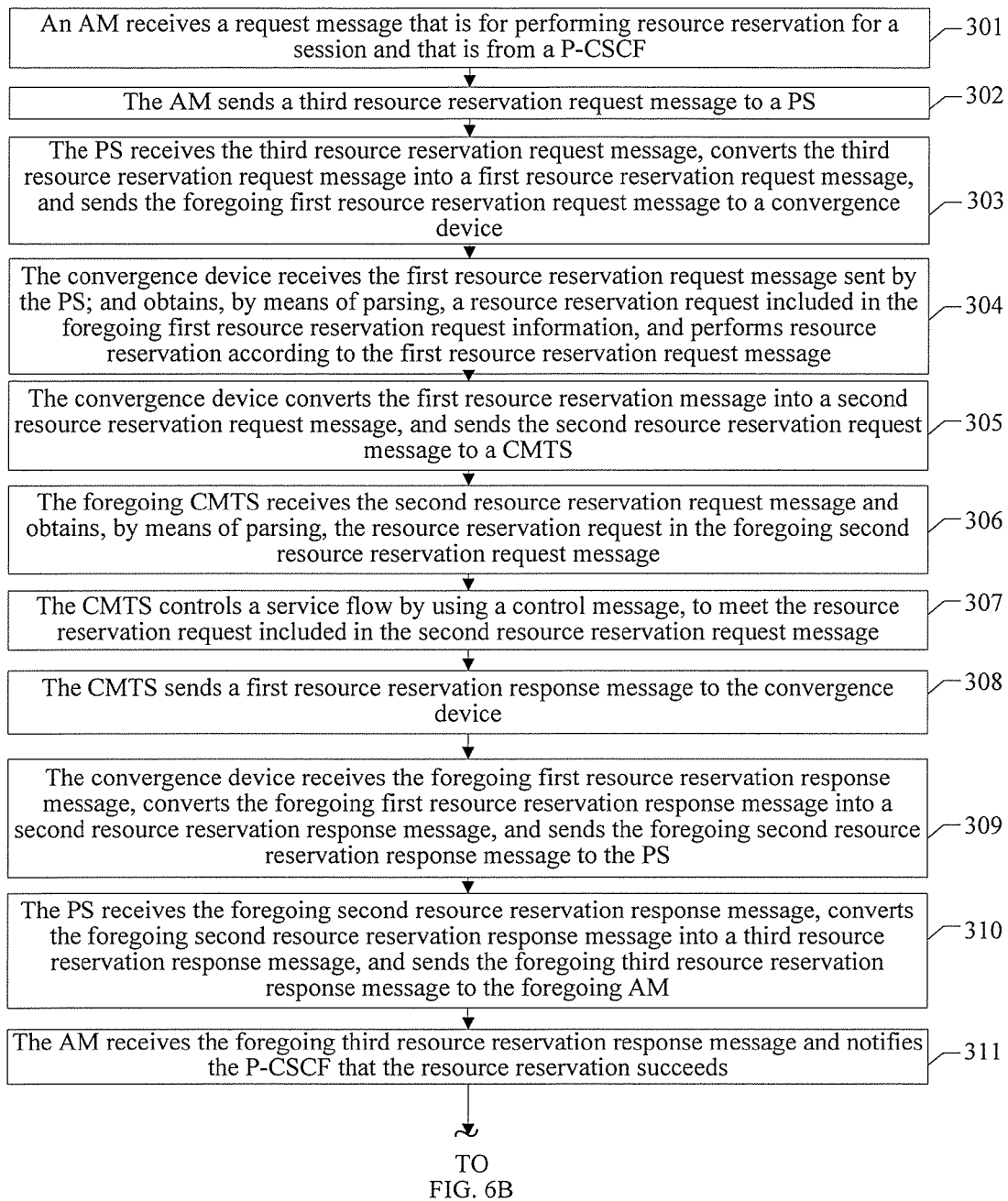
FIG. 6A and FIG. 6B are a schematic flowchart of a resource reservation method according to method embodiment 3.
Figure 6B:
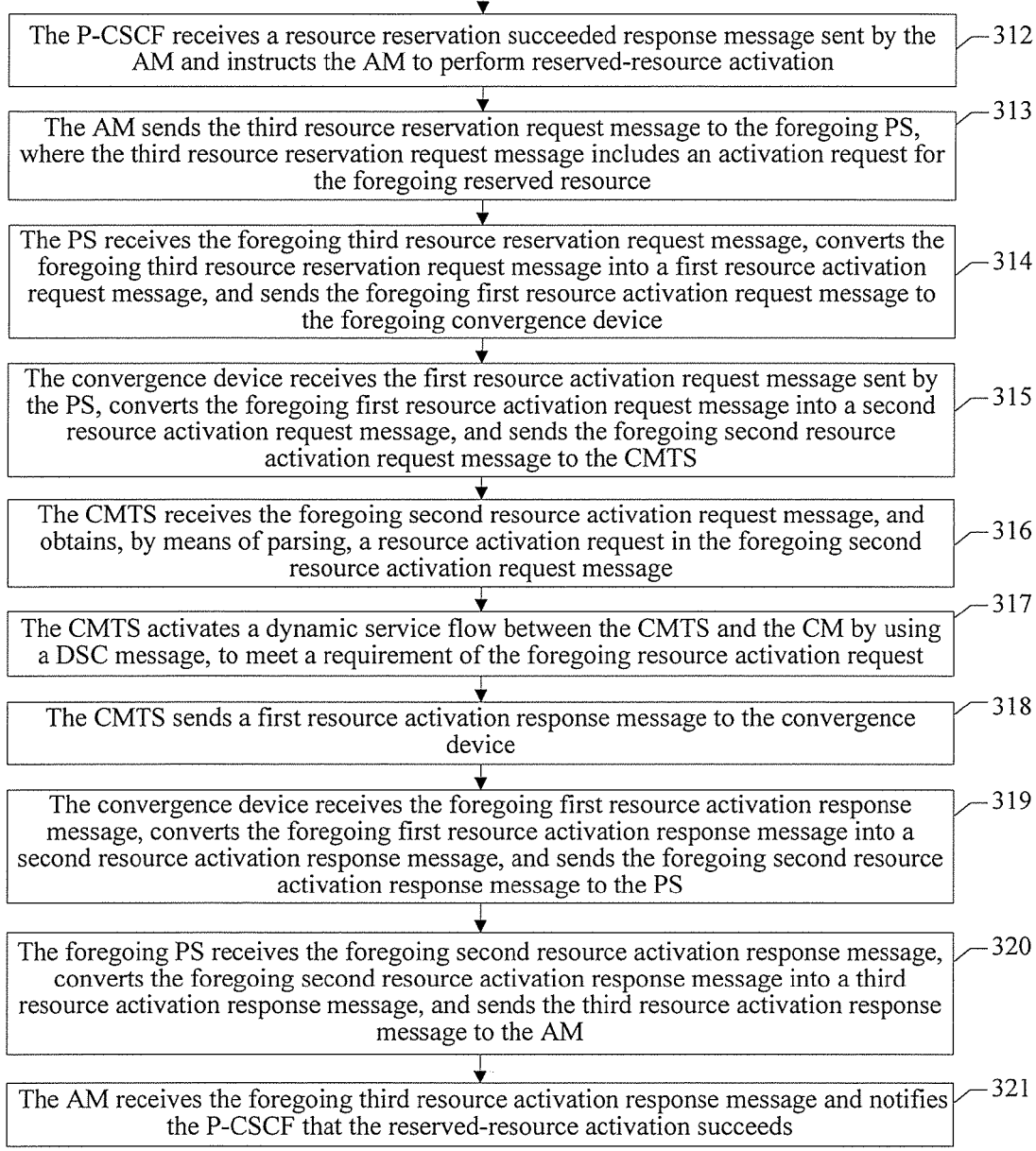
Figure 7:
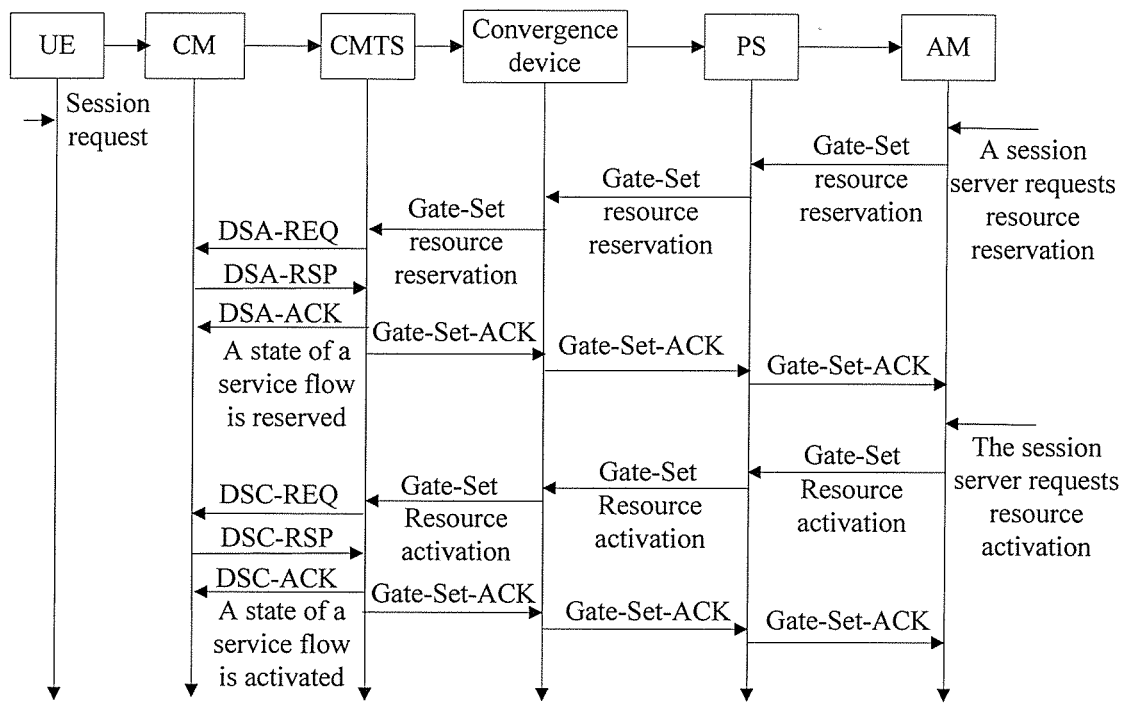
FIG. 7 is a schematic diagram of message transferring in method embodiment 3.

Referring to FIG. 6A and FIG. 6B, and FIG. 7, the present invention provides a resource reservation method, including:

301: An AM receives a request message that is for performing resource reservation for a session and that is from a P-CSCF.

When a subscriber end needs to establish a session, and initiates a session establishment request to the P-CSCF by using a Gm interface, the P-CSCF instructs, by using an Rx interface, the AM to perform resource reservation for the foregoing session.

After receiving the request message, the AM parses the request message to determine a QoS resource required by the session or a QoS resource occupied by the session, and generates a third resource reservation request message.

302: The foregoing AM sends a third resource reservation request message (Gate-Set) to a PS by using a pkt-mm-3 interface, where the foregoing third resource reservation request message (Gate-Set) includes a resource reservation request corresponding to the foregoing to-be-established session.

The foregoing resource reservation request message includes at least a QoS parameter and a packet flow classification parameter that are corresponding to the foregoing to-be-established session.

In this embodiment, the AM sends the third resource reservation request message (Gate-Set) to the PS according to the QoS resource required by the foregoing session, so as to deliver the resource reservation request.

In this embodiment, communication between the AM and the PS is performed by using the pkt-mm-3 interface, and therefore the foregoing third Gate-Set resource reservation request (Gate-Set) message is a message based on the pkt-mm-3 interface.

303: The foregoing PS receives the foregoing third resource reservation request message (Gate-Set), converts the foregoing third resource reservation request message (Gate-Set) into a first resource reservation request message (Gate-Set), and sends the foregoing first resource reservation request message (Gate-Set) to the foregoing convergence device.

In this embodiment, communication between the convergence device and the PS is performed by using a pkt-mm-2 interface, and therefore the foregoing first resource reservation request message (Gate-Set) is a Gate-Set message based on the pkt-mm-2 interface, and the first resource reservation message (Gate-Set) includes the resource reservation request.

304: The foregoing convergence device receives the first resource reservation request message (Gate-Set) sent by the PS; and optionally, the convergence device may further obtain, by means of parsing, the resource reservation request included in the first resource reservation request message (Gate-Set) and perform resource reservation between the convergence device and a CMTS according to the resource reservation request.

305: The foregoing convergence device converts the foregoing first resource reservation request message (Gate-Set) into a second resource reservation request message (Gate-Set), and sends the second resource reservation request message (Gate-Set) to the CMTS.

In this embodiment, communication between the convergence device and the CMTS is performed by using a pkt-mm-2' interface, and therefore the convergence device converts the first resource reservation request message (Gate-Set) into a second resource reservation request message (Gate-Set) that is based on the pkt-mm-2' interface, so that the second resource reservation request message (Gate-Set) can be sent to the CMTS.

306: The foregoing CMTS receives the second resource reservation request (Gate-Set) message and obtains, by means of parsing, the resource reservation request included in the foregoing second resource reservation request message (Gate-Set).

307: The CMTS controls, by using a DSA message, addition of a dynamic service flow between the CMTS and a CM, to meet the resource reservation request included in the foregoing second resource reservation request message (Gate-Set).

Specifically, as shown in FIG. 7, that the CMTS controls, by using a DSA message, addition of a dynamic service flow between the CMTS and a CM may include: sending, by the CMTS, a service addition request message DSA-REQ to the CM to request addition of a dynamic service flow; adding, by the CM, a dynamic service flow according to the request, and returning a response message DSA-RSP to the CMTS; and returning, by the CMTS after receiving the response message DSA-RSP, an acknowledgement message DSA-ACK.

308: The CMTS sends a first resource reservation response message (Gate-Set-ACK) to the convergence device.

After the dynamic service flow is added and the foregoing resource reservation request is successfully responded to, the CMTS generates the first resource reservation response message (Gate-Set-ACK), and sends the first resource reservation response message (Gate-Set-ACK) to the convergence device, where the Gate-Set-ACK message is an acknowledgement message for the foregoing Gate-Set message. Communication between the CMTS and the convergence device is performed by using the pkt-mm-2' interface, and therefore the first resource reservation response message (Gate-Set-ACK) is a message based on the pkt-mm-2' interface.

309: The convergence device receives the foregoing first resource reservation response message (Gate-Set-ACK), converts the foregoing first resource reservation response message (Gate-Set-ACK) into a second resource reservation response message (Gate-Set-ACK), and sends the second resource reservation response message (Gate-Set-ACK) to the PS.

Communication between the convergence device and the PS is performed by using the pkt-mm-2 interface, and therefore the convergence device converts the first Gate-Set-ACK message into a message that is based on the pkt-mm-2 interface.

310: The foregoing PS receives the foregoing second resource reservation response message (Gate-Set-ACK) message, converts the foregoing second resource reservation response message (Gate-Set-ACK) into a third resource reservation response message (Gate-Set-ACK), and sends the third resource reservation response message (Gate-Set-ACK) to the AM.

Communication between the PS and the AM is performed by using the pkt-mm-3 interface, and therefore the PS converts the second resource reservation response message (Gate-Set-ACK) message into a message based on the pkt-mm-3 interface.

311: The AM receives the foregoing third resource reservation response message (Gate-Set-ACK) and notifies the P-CSCF that the resource reservation succeeds.

After receiving the foregoing third resource reservation response message, the AM may notify, by using a response message, the P-CSCF that the resource reservation process is complete, where the response message is a response to the request message, received by the AM in step 301, for performing resource reservation for a session.

312: The P-CSCF receives a resource reservation succeeded response message sent by the AM and instructs the AM to perform reserved-resource activation.

The P-CSCF may notify a call server that is of the session by means of application layer signaling after receiving the resource reservation succeeded response message, the call server requests a subscriber at a peer end of the session to establish a call connection, and after the peer end receives the call connection request, the call server instructs, by using the P-CSCF, the AM to perform reserved-resource activation.

313: The foregoing AM sends the third resource reservation request message (Gate-Set) to the foregoing PS, where the third resource reservation request message (Gate-Set) includes an activation request for the foregoing reserved resource.

In this embodiment, the AM sends the third resource reservation request message (Gate-Set) to the PS according to the QoS resource required by the foregoing session, so as to deliver the resource reservation request.

In this embodiment, communication between the AM and the PS is performed by using the pkt-mm-3 interface, and therefore the foregoing third resource reservation request message (Gate-Set) is a message based on the pkt-mm-3 interface.

314: The foregoing PS receives the foregoing third resource reservation request message (Gate-Set), converts the foregoing third resource reservation request message (Gate-Set) into a first resource activation request message (Gate-Set), and sends the foregoing first resource activation request message (Gate-Set) to the foregoing convergence device.

In this embodiment, communication between the convergence device and the PS is performed by using the pkt-mm-2 interface, and therefore the foregoing first resource activation request message (Gate-Set) is a Gate-Set message based on the pkt-mm-2 interface, and the first resource activation request message (Gate-Set) includes the resource reservation request.

315: The foregoing convergence device receives the first resource activation request message (Gate-Set) sent by the PS, converts the foregoing first resource activation request message into a second resource activation request message, and sends the foregoing second resource activation request message to the CMTS.

In this embodiment, communication between the convergence device and the CMTS is performed by using the pkt-mm-2' interface, and therefore the convergence device converts the first resource activation request message into a second resource activation request message that is based on the pkt-mm-2' interface, so that the second resource activation request message can be sent to the CMTS.

316: The foregoing CMTS receives the foregoing second resource activation request message (Gate-Set), and obtains, by means of parsing, a resource activation request in the foregoing second resource activation request message.

In this embodiment, the second resource activation request message includes a reserved-resource activation request, the CMTS obtains, by means of parsing, the resource activation request included in the second resource activation request message and may acquire that which dynamic service flow is specifically requested, by the resource activation request, to be activated.

317: The CMTS activates a corresponding dynamic service flow between the CMTS and the CM by using a DSC message, to meet a requirement of the foregoing resource activation request.

Figure 8:
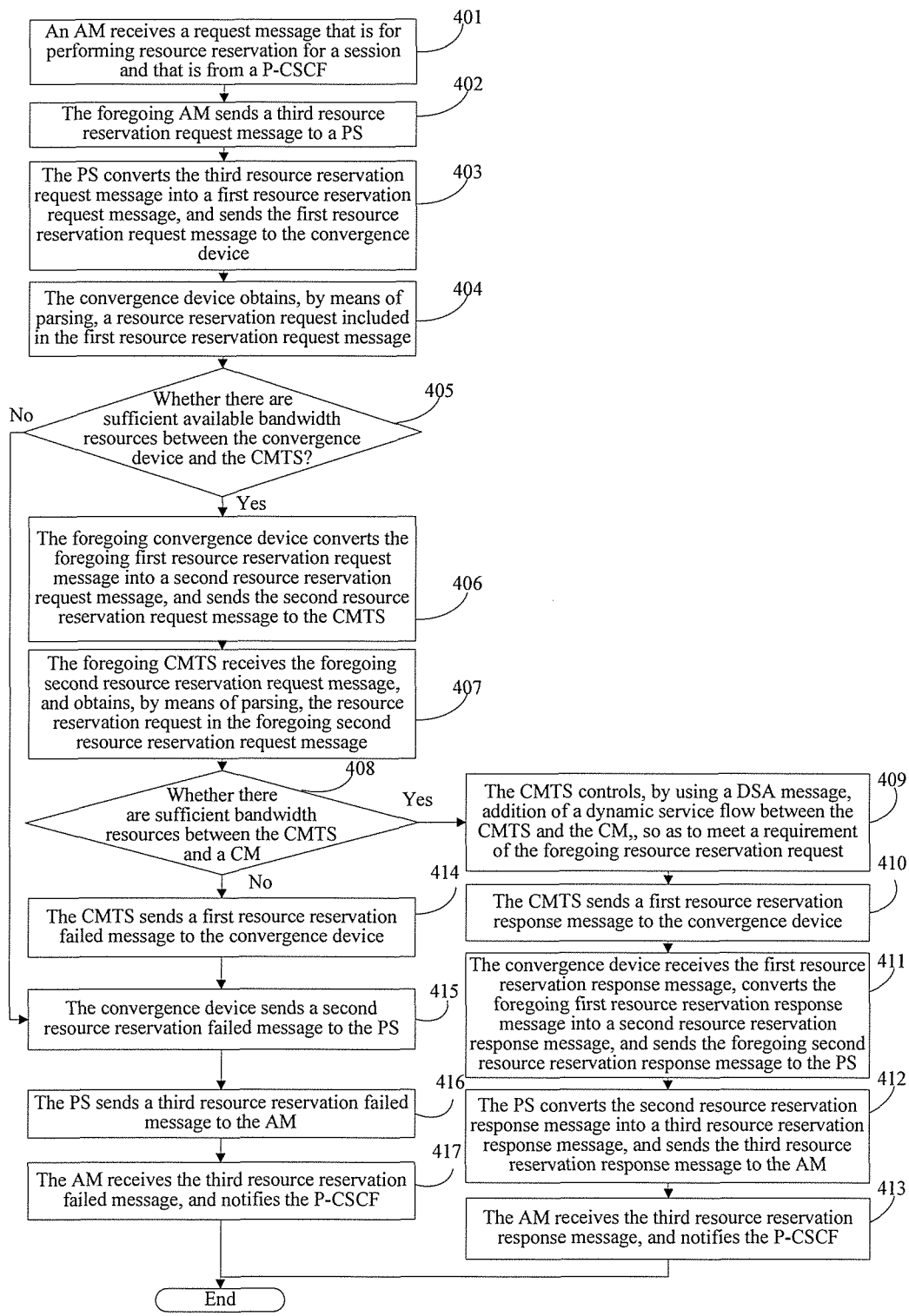
FIG. 8 is a schematic flowchart of a resource reservation method according to method embodiment 4.

Specifically, as shown in FIG. 8, that the CMTS activates a corresponding service flow between the CMTS and the CM by using a DSC message may include: sending, by the CMTS, a request message DSC-REQ to the CM to request an attribute of the dynamic service flow to be changed to an activated state; activating, by the CM, the dynamic service flow according to the request, and returning a response message DSC-RSP to the CMTS; and after receiving the response message DSC-RSP, returning, by the CMTS, an acknowledgement message DSC-ACK.

318: The CMTS sends a first resource activation response message (Gate-Set-ACK) to the convergence device.

After the corresponding dynamic service flow is activated, and the foregoing resource activation request is successfully responded to, the CMTS generates the first resource activation response message (Gate-Set-ACK), and sends the foregoing first resource activation response message (Gate-Set-ACK) to the convergence device, where the Gate-Set-ACK message is an acknowledgement message for the foregoing Gate-Set message. Communication between the CMTS and the convergence device is performed by using the pkt-mm-2' interface, and therefore the first resource activation response message is a message based on the pkt-mm-2' interface.

319: The convergence device receives the foregoing first resource activation response message (Gate-Set-ACK), converts the foregoing first resource activation response message (Gate-Set-ACK) into a second resource activation response message (Gate-Set-ACK), and sends the foregoing second resource activation response message (Gate-Set-ACK) to the PS.

Communication between the convergence device and the PS is performed by using the pkt-mm-2 interface, and therefore the convergence device converts the first resource activation response message into a message that is based on the pkt-mm-2 interface.

320: The foregoing PS receives the foregoing second resource activation response message (Gate-Set-ACK), converts the foregoing second resource activation response message (Gate-Set-ACK) into a third resource activation response message (Gate-Set-ACK), and sends the third resource activation response message (Gate-Set-ACK) to the AM.

Communication between the PS and the AM is performed by using the pkt-mm-3 interface, and therefore the PS converts the second resource activation response message into a message that is based on the pkt-mm-3 interface.

321: The AM receives the foregoing third resource activation response message (Gate-Set-ACK) and notifies the P-CSCF that the reserved-resource activation succeeds.

After the reserved-resource activation succeeds, the subscriber end can start a normal session.

This embodiment mainly describes a procedure in which a dynamic service flow is added and activated according to a session establishment requirement of a subscriber end, and dynamic resource reservation and activation are implemented, thereby performing a normal session.

Method Embodiment 4

Figure 10:
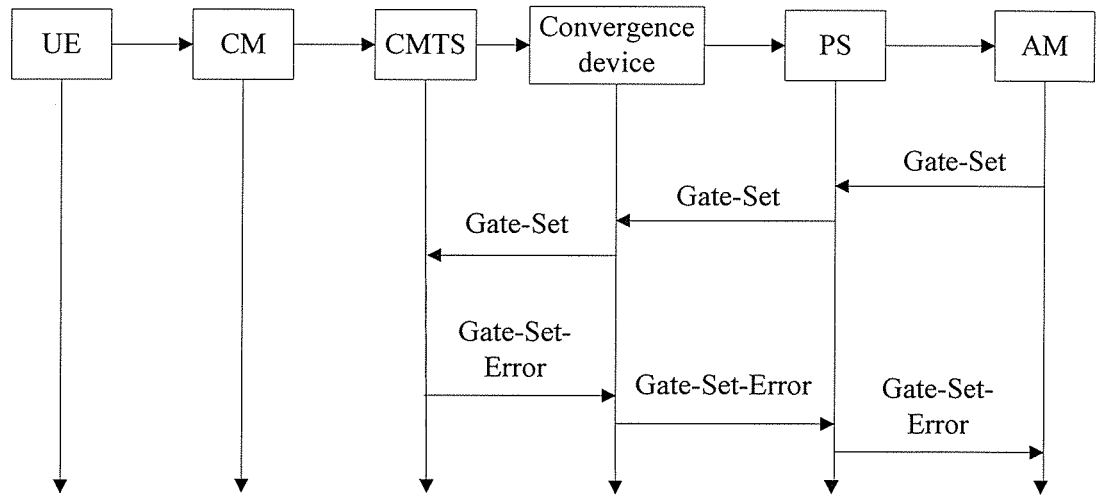
FIG. 10 is a second schematic diagram of message transferring in method embodiment 4.

Referring to FIG. 7 and FIG. 10, the present invention provides a resource reservation method, including:

401: An AM receives a request message that is for performing resource reservation for a session and that is from a P-CSCF, where the foregoing session is a session that requires resource reservation.

In this embodiment, when a subscriber end needs to establish a session (such as, a voice session or a video session) that requires resource reservation, and initiates a session request to the P-CSCF by using a Gm interface, the P-CSCF instructs, by using an Rx interface, the AM to perform resource reservation for the foregoing session. After receiving the request information, the AM parses the request information to determine a QoS resource required by the session, and generates a third resource reservation request message.

402: The foregoing AM sends a third resource reservation request message (Gate-Set) to a PS by using a pkt-mm-3 interface.

The foregoing third resource reservation request message includes at least a QoS parameter and a packet flow classification parameter that are corresponding to the foregoing session establishment request.

In this embodiment, the AM sends the third resource reservation request message to the PS according to the QoS resource required by the foregoing session, so as to deliver a resource reservation request.

In this embodiment, communication between the AM and the PS is performed by using the pkt-mm-3 interface, and therefore the foregoing first Gate-Set message is a message based on the pkt-mm-3 interface.

403: The foregoing PS receives the foregoing third resource reservation request message (Gate-Set), converts the foregoing third resource reservation request message (Gate-Set) into a first resource reservation request message (Gate-Set), and sends the foregoing first resource reservation request message (Gate-Set) to the foregoing convergence device.

In this embodiment, communication between the convergence device and the PS is performed by using a pkt-mm-2 interface, and therefore the PS converts the third resource reservation request message into a first resource reservation request message that is based on the pkt-mm-2 interface.

404: The foregoing convergence device receives the first resource reservation request message (Gate-Set) sent by the PS, and obtains, by means of parsing, a resource reservation request included in the first resource reservation request message.

When obtaining, by means of parsing, the resource reservation request included in the first resource reservation request message, the convergence device may acquire a QoS parameter in the resource reservation request, where the QoS parameter includes a size of bandwidth required for implementing the foregoing resource reservation request.

405: The convergence device determines whether an available bandwidth resource between the convergence device and the foregoing CMTS meets the foregoing resource reservation request (that is, whether there is sufficient bandwidth for meeting bandwidth required by the foregoing resource reservation request); and if yes, executes step 406; otherwise, executes step 415.

406: The foregoing convergence device converts the foregoing first resource reservation request message (Gate-Set) into a second resource reservation request message (Gate-Set), and sends the second resource reservation request message (Gate-Set) to the CMTS.

In this embodiment, communication between the convergence device and the CMTS is performed by using a pkt-mm-2' interface, and therefore the convergence device converts the first resource reservation request message into the second resource reservation request message that is based on the pkt-mm-2' interface, so that the second resource reservation request message can be sent to the CMTS.

407: The foregoing CMTS receives the foregoing second resource reservation request message (Gate-Set), and obtains, by means of parsing, the resource reservation request in the second resource reservation request message to acquire a QoS parameter.

In this embodiment, the second resource reservation request message includes the resource reservation request, and the CMTS obtains, by means of parsing, the resource reservation request included in the second resource reservation request message to acquire the QoS parameter in the resource reservation request, where the QoS parameter includes the size of the bandwidth required for implementing the foregoing resource reservation request.

408: The foregoing CMTS determines whether an available bandwidth resource between the CMTS and a CM can meet the foregoing resource reservation request (that is, whether there is sufficient bandwidth for meeting bandwidth required by the foregoing resource reservation request); if yes, executes step 409; otherwise, executes step 414.

409: The foregoing CMTS controls, by using a DSA message, addition of a dynamic service flow, matching the foregoing QoS parameter, between the CMTS and the CM, so as to meet a requirement of the foregoing resource reservation request.

Specifically, as shown in FIG. 7, that the foregoing CMTS controls, by using a DSA message, addition of a dynamic service flow, between the CMTS and the CM, that matches the foregoing QoS parameter may include: sending, by the CMTS, a service addition request message DSA-REQ to the CM to request addition of a corresponding dynamic service flow; adding, by the CM, a dynamic service flow corresponding to the request, and returning a response message DSA-RSP to the CMTS; and returning, by the CMTS after receiving the response message DSA-RSP, an acknowledgement message DSA-ACK.

410: The CMTS sends a first resource reservation response message (Gate-Set-ACK) to the convergence device.

After the dynamic service flow is added and the foregoing resource reservation request is successfully responded to, the CMTS generates the first resource reservation response message, and sends the first resource reservation response message to the convergence device, where the Gate-Set-ACK message is an acknowledgement message for the foregoing Gate-Set message. Communication between the CMTS and the convergence device is performed by using the pkt-mm-2' interface, and therefore the first resource reservation response message is a message based on the pkt-mm-2' interface.

411: The convergence device receives the foregoing first resource reservation response message (Gate-Set-ACK), converts the foregoing first resource reservation response message into a second resource reservation response message (Gate-Set-ACK), and sends the second resource reservation response message (Gate-Set-ACK) to the PS.

Communication between the convergence device and the PS is performed by using the pkt-mm-2 interface, and therefore the convergence device converts the first resource reservation response message into a second resource reservation response message that is based on the pkt-mm-2 interface.

412: The foregoing PS receives the foregoing second resource reservation response message (Gate-Set-ACK), converts the foregoing second resource reservation response message into a third resource reservation response message (Gate-Set-ACK), and sends the third resource reservation response message (Gate-Set-ACK) to the AM.

Communication between the PS and the AM is performed by using the pkt-mm-3 interface, and therefore the PS converts the second resource reservation response message into a third resource reservation response message that is based on the pkt-mm-3 interface.

413: The foregoing AM receives the foregoing third resource reservation response message (Gate-Set-ACK) and notifies the P-CSCF that the resource reservation succeeds, and the procedure ends.

After receiving the third resource reservation response message, the AM may notify, by using a response message, the P-CSCF that the resource reservation process is complete, where the response message is a response to the request message, received by the AM in step 401, for performing resource reservation for a session.

414: The foregoing CMTS sends a first resource reservation failed message (Gate-Set-Error) to the foregoing convergence device.

The Gate-Set-Error message is a message indicating failure in resource reservation. As shown in FIG. 10, when a result of the determining in step 408 is that the available bandwidth resource between the CMTS and the CM cannot meet the foregoing resource reservation request (there is no sufficient bandwidth resource, between the CMTS and the CM, for meeting the resource reservation request), the CMTS sends the first resource reservation failed message (Gate-Set-Error) to the convergence device to indicate the failure in the resource reservation. Communication between the CMTS and the convergence device is performed by using the pkt-mm-2' interface, and therefore the first resource reservation failed message is a message based on the pkt-mm-2' interface.

415: The foregoing convergence device sends a second resource reservation failed message (Gate-Set-Error) to the foregoing PS.

Figure 9:
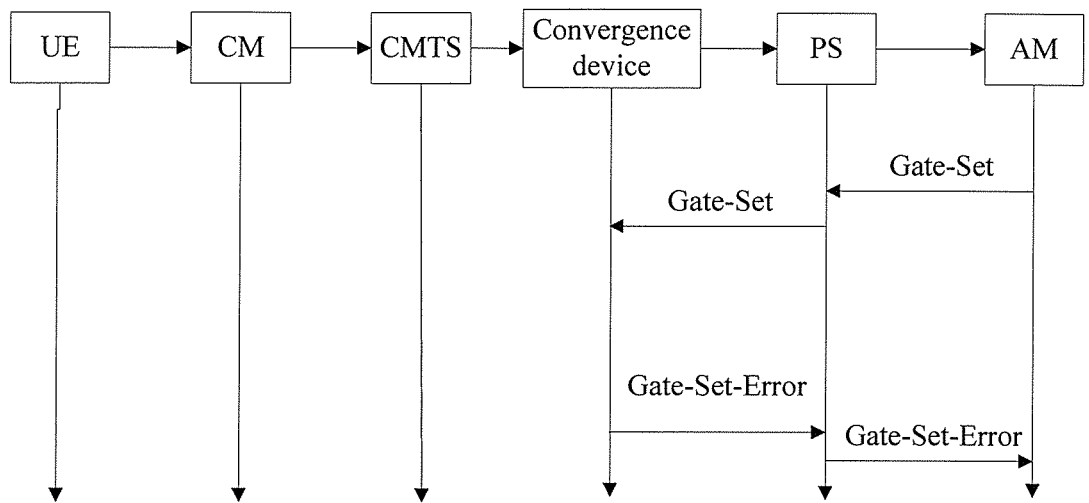
FIG. 9 is a first schematic diagram of message transferring in method embodiment 4.

As shown in FIG. 9, when a result of the determining in step 405 is that the available bandwidth resource between the convergence device and the foregoing CMTS does not meet the foregoing resource reservation request, the convergence device sends the second resource reservation failed message (Gate-Set-Error) to the PS to indicate session establishment failure. Communication between the convergence device and the PS is performed by using the pkt-mm-2 interface, and therefore the second resource reservation failed message is a message based on the pkt-mm-2 interface. If the convergence device receives the first resource reservation failed message, the convergence device converts the first resource reservation failed message into the second resource reservation failed message, and sends the second resource reservation failed message to the PS.

416: The foregoing PS receives the second resource reservation failed message, converts the second resource reservation failed message into a third resource reservation failed message (Gate-Set-Error), and sends the third resource reservation failed message to the AM.

Communication between the PS and the AM is performed by using the pkt-mm-3 interface, and therefore the PS converts the second resource reservation failed message (Gate-Set-Error) into a third resource reservation failed message that is based on the pkt-mm-3 interface, and sends the third resource reservation failed message to the AM.

417: The AM receives the third resource reservation failed message (Gate-Set-Error message), and notifies the P-CSCF, so as to notify the subscriber end of failure in resource reservation performed for the session.

In this embodiment, if the CMTS or the convergence device determines that the bandwidth resource cannot meet the resource reservation request, a procedure of creating a session in a downlink direction is no longer executed, but the Gate-Set-Error message is directly sent to the AM in an uplink direction, and the AM notifies, by using the P-CSCF, the subscriber end of failure in resource reservation.

After the resource reservation is complete, a reserved resource still needs to be activated to perform a normal session. The process is the same as that in Embodiment 3, and details are not described herein again.

Method Embodiment 5

Figure 11:
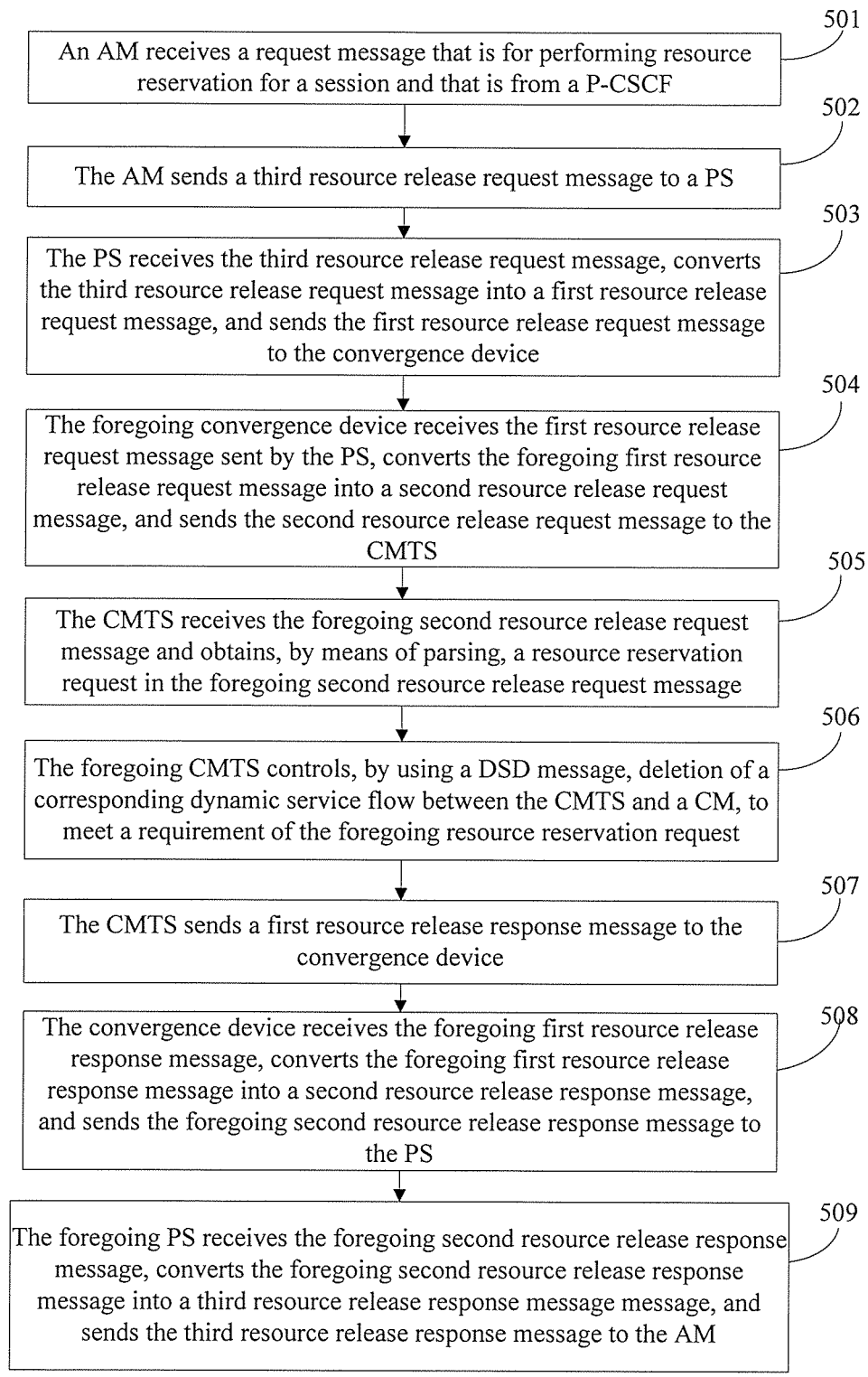
FIG. 11 is a schematic flowchart of a resource reservation method according to method embodiment 5.
Figure 12:
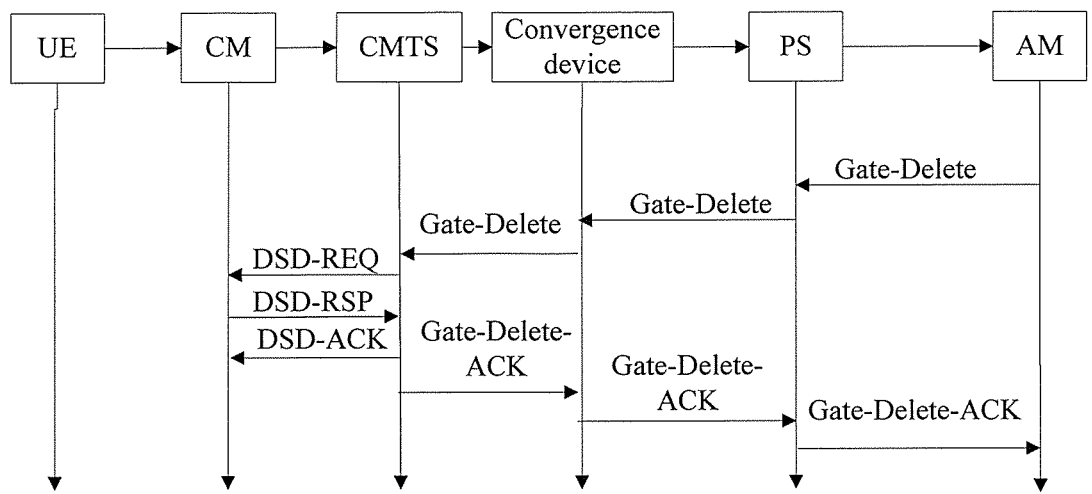
FIG. 12 is a schematic diagram of message transferring in method embodiment 5.

Referring to FIG. 11 and FIG. 12, the present invention provides a resource reservation method, including the following steps:

501: An AM receives a request message that is for performing resource release for a session and that is from a P-CSCF, where the foregoing session is a session that requires resource reservation.

In this embodiment, when a subscriber end terminates a session (for example, hanging up during a voice or video call) that requires resource reservation, and transmits, by using a Gm interface, request information for terminating the session to the P-CSCF, the P-CSCF instructs, by using an Rx interface, the AM to release a resource occupied the foregoing session; and after receiving the request information, the AM parses the request information to determine a QoS resource occupied by the session.

502: The foregoing AM sends a third resource release request message (Gate-Delete message) to the foregoing PS, where the foregoing third resource release request message (Gate-Delete message) includes a resource reservation request corresponding to the foregoing session termination request.

The foregoing resource reservation request includes at least a QoS parameter and a packet flow classification parameter corresponding to the foregoing session termination request.

In this embodiment, the AM sends the third resource release request message (Gate-Delete message) to the PS according to the QoS resource occupied by the foregoing session, to deliver the resource reservation request.

In this embodiment, communication between the AM and the PS is performed by using a pkt-mm-3 interface, and therefore the foregoing third resource release request message (Gate-Delete message) is a message based on the pkt-mm-3 interface.

503: The foregoing PS receives the foregoing third resource release request message (Gate-Delete message), converts the foregoing third resource release request message (Gate-Delete message) into a first resource release request message (Gate-Delete message), and sends the foregoing first resource release request message (Gate-Delete message) to the foregoing convergence device.

504: The foregoing convergence device receives the first resource release request message (Gate-Delete message) sent by the PS, converts the foregoing first resource release request message into a second resource release request message, and sends the second resource release request message to the CMTS.

In this embodiment, communication between the convergence device and the PS is performed by using a pkt-mm-2 interface, and therefore the foregoing first resource release request message is a Gate-Delete message based on the pkt-mm-2 interface.

In this embodiment, communication between the convergence device and the CMTS is performed by using a pkt-mm-2' interface, and therefore the convergence device converts the first resource release request message into a second resource release request message that is based on the pkt-mm-2' interface, so that the second resource release request message can be sent to the CMTS.

505: The foregoing CMTS receives the foregoing second resource release request message (Gate-Delete message), and obtains, by means of parsing, the resource reservation request in the foregoing second resource release request message.

In this embodiment, the second resource release request message includes the resource reservation request, and the CMTS obtains, by means of parsing, the resource reservation request included in the second resource release request message, so that a GateID of a dynamic service flow that needs to be deleted may be acquired.

506: The foregoing CMTS controls, by using a DSD message, deletion of a corresponding dynamic service flow between the CMTS and a CM, to meet a requirement of the foregoing resource reservation request.

Specifically, as shown in FIG. 12, that the foregoing CMTS controls, by using a DSD message, deletion of a corresponding dynamic service flow between the CMTS and a CM may include: sending, by the CMTS to the CM, a request message DSD-REQ to request deletion of a corresponding dynamic service flow; deleting, by the CM, the dynamic service flow according to the request, and returning a response message DSD-RSP to the CMTS; and returning, by the CMTS after receiving the response message DSD-RSP, an acknowledgement message DSD-ACK.

507: The CMTS sends a first resource release response message (Gate-Delete-ACK message) to the convergence device.

After the corresponding dynamic service flow is successfully deleted, and the foregoing resource reservation request is implemented, the CMTS generates the first resource release response message, and sends the first resource release response message to the convergence device, where the Gate-Delete-ACK message is an acknowledgement message for the foregoing Gate-Delete message. Communication between the CMTS and the convergence device is performed by using the pkt-mm-2' interface, and therefore the first resource release acknowledgement message is a message based on the pkt-mm-2' interface.

508: The convergence device receives the foregoing first resource release response message (Gate-Delete-ACK message), converts the foregoing first resource release response message (Gate-Delete-ACK message) into a second resource release response message (Gate-Delete-ACK message), and sends the second resource release response message (Gate-Delete-ACK message) to the PS.

Communication between the convergence device and the PS is performed by using the pkt-mm-2 interface, and therefore the convergence device converts the first resource release response message into a message based on the pkt-mm-2 interface.

509: The foregoing PS receives the foregoing second resource release response message (Gate-Delete-ACK message), converts the foregoing second resource release response message (Gate-Delete-ACK message) into a third resource release response message (Gate-Delete-ACK) message, and sends the third resource release response message to the AM.

Communication between the PS and the AM is performed by using the pkt-mm-3 interface, and therefore the PS converts the second Gate-Delete-ACK message into a third resource release response message that is based on the pkt-mm-3 interface.

This embodiment mainly describes a process in which a dynamic QoS resource is reclaimed after a subscriber end terminates a session.

The following describes a resource reservation system provided in the present invention:

System Embodiment

Figure 13:
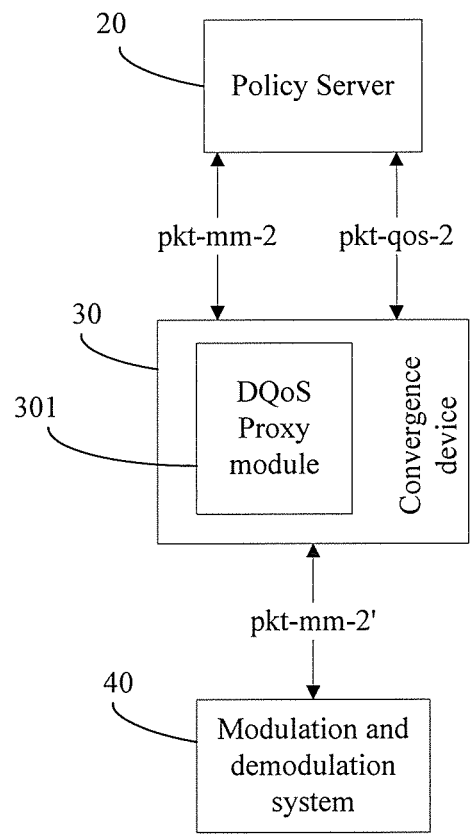
FIG. 13 is a first schematic diagram of a structure of a resource reservation system according to a system embodiment.

As shown in FIG. 13, the present invention further provides a resource reservation system. The system may be configured to execute a procedure shown in FIG. 4. The resource reservation system includes a policy server PS 20, a convergence device 30, and a modulation and demodulation system 40, where the convergence device 30 is connected to the PS 20 by using a first interface, and the convergence device 30 is connected to the modulation and demodulation system 40 by using a second interface.

The convergence device 30 is configured to: receive a first resource reservation request message from the PS 20 by using the first interface; convert the first resource reservation request message that is based on a format of the first interface into a second resource reservation request message that is based on a format of the second interface; and send the second resource reservation request message to the modulation and demodulation system 40 by using the second interface.

The modulation and demodulation system 40 is configured to perform resource reservation according to the second resource reservation request message.

Optionally, the foregoing format of the first interface is pkt-mm-2, and the format of the second interface is pkt-mm-2'.

Figure 14:
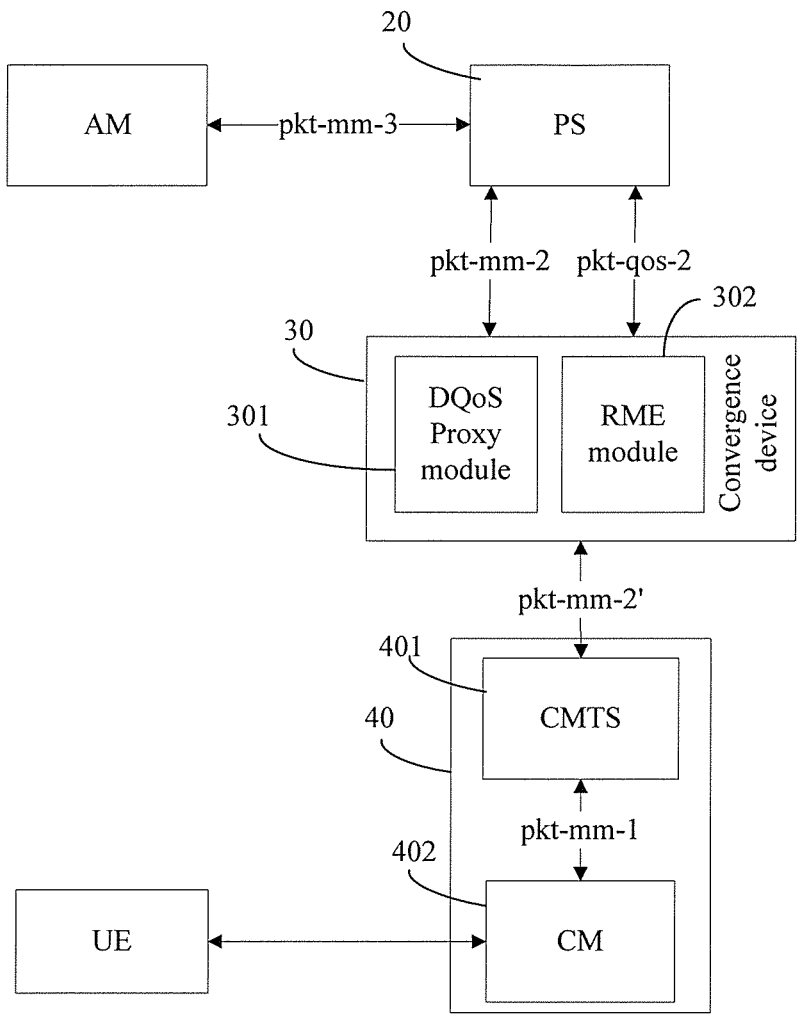
FIG. 14 is a second schematic diagram of a structure of a resource reservation system according to a system embodiment.

Specifically, as shown in FIG. 14, the modulation and demodulation system 40 includes a CMTS 401 and a CM 402 connected to the CMTS 401 by using a pkt-mm-1 interface, where the CMTS 401 is connected to the convergence device 20 by using the second interface pkt-mm-2', and the CM 402 is connected to a subscriber end 50.

As shown in FIG. 13, the convergence device 30 includes a DQoS Proxy module 301, where the DQoS Proxy module 301 is specifically configured to: convert a received message that is based on the format of the first interface and that is from the PS 20 into a message that is based on the format of the second interface; and convert a received message that is based on the format of the second interface and that is from the modulation and demodulation system 40 (which is specifically the CMTS 401) into a message that is based on the format of the first interface.

The convergence device can play a dynamic proxy function between the PS 20 and the CMTS 401 by using the DQoS Proxy module 301.

Optionally, as shown in FIG. 14, the convergence device 30 may further include an RME module (Resource Management Entity) 302. The RME module 302 may be specifically configured to parse the first resource reservation request message that is from the PS 20 and perform resource reservation according to the first resource reservation request message.

Figure 1:
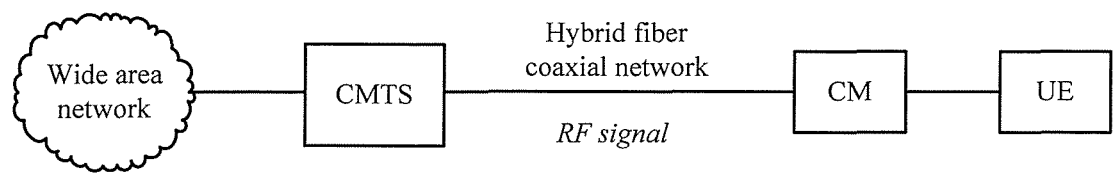
FIG. 1 is a schematic diagram of connection in a DOCSIS network architecture.
Figure 2:
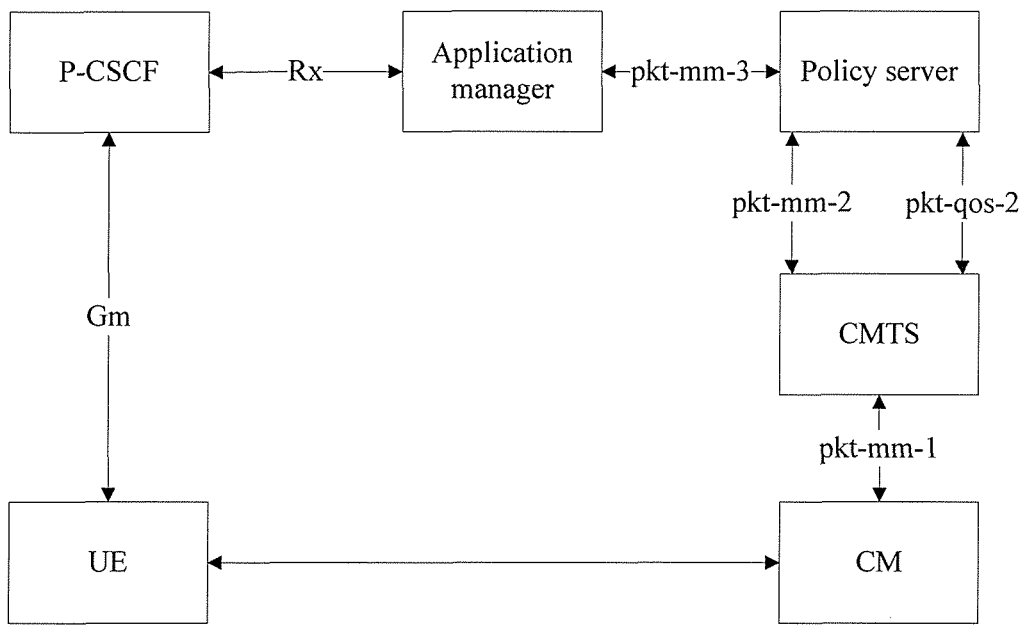
FIG. 2 is a schematic diagram of an architecture and an interface that are involved in resource reservation on a DOCSIS network.
Figure 3:
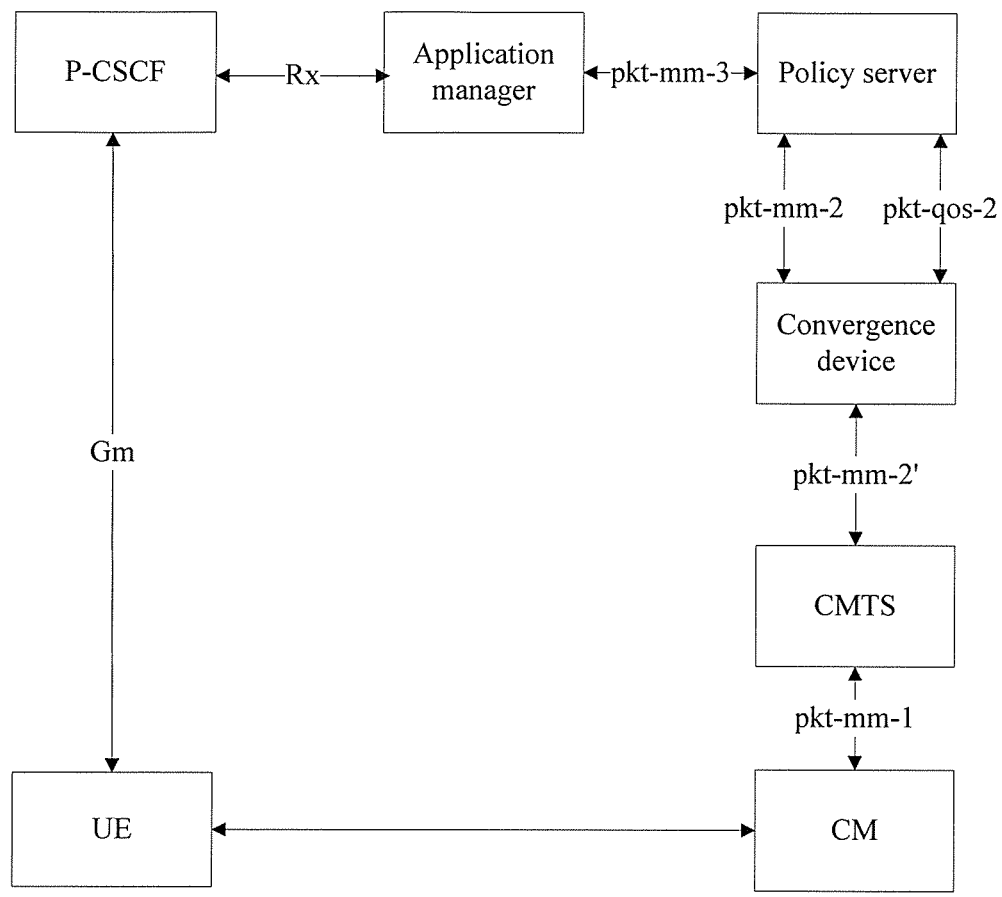
FIG. 3 is a schematic diagram of an architecture and an interface that are involved in resource reservation on a C-DOCSIS network.

As shown in FIG. 3 and FIG. 14, the resource reservation system provided in the present invention further includes an AM and a P-CSCF, where the AM is connected to the PS 20 by using a pkt-mm-3 interface, the AM is connected to the P-CSCF by using an Rx interface, and the P-CSCF is connected to a UE by using a Gm interface.

Further, the convergence device 30 is further configured to receive, by using a pkt-qos-2 interface, a CPD request message sent by the foregoing PS 20, and if a querying UE device is connected to a CMTS subordinated to the convergence device, the convergence device sends a CPD response message to the PS 20.

Further, the convergence device 30 may be further configured to: relay a DHCP packet of the subscriber terminal UE, and acquire a correspondence between the UE and the CMTS 401 (or acquire a correspondence between the UE and a CMC) from the foregoing DHCP packet; and send the foregoing correspondence to the PS 20 by using the pkt-qos-2 interface.

Optionally, the convergence device 30 may be further configured to: receive a first resource activation request message that is based on the format of the first interface and that is from the PS 20; convert the foregoing first resource activation request message into a second resource activation request message that is based on the format of the second interface; and send, by the convergence device 30, the foregoing second resource activation request message that is based on the format of the second interface to the modulation and demodulation system 40 (specifically, the foregoing second resource activation request message is sent to the CMTS 401).

The modulation and demodulation system 40 is further configured to perform resource activation according to the foregoing second resource activation request message.

Under a C-DOCSIS system architecture, the foregoing resource reservation system may be configured to perform resource reservation. Functions of devices or function entities in a resource reservation procedure are as follows:

When a subscriber end UE needs to establish a session, and the UE initiates a session request to the P-CSCF by using a Gm interface, the P-CSCF instructs, by using the Rx interface, the AM to perform resource reservation for the foregoing session.

The AM may be configured to receive a request message that is for performing resource reservation for the session and that is from the P-CSCF, where the foregoing session is a session that requires resource reservation; and is configured to send a third resource reservation request message to the PS 20, where the foregoing third resource reservation request message includes a resource reservation request corresponding to the session to be established by the foregoing UE.

The PS 20 may be configured to receive the foregoing third resource reservation request message by using the pkt-mm-3 interface, convert the foregoing third resource reservation request message into a first resource reservation request message, and sends the first resource reservation request message to the convergence device 30.

The convergence device 30 may be configured to receive, by using the pkt-qos-2 interface, a CPD request message sent by the foregoing PS 20, and if a querying UE device is connected to the CMTS subordinate to the convergence device, the convergence device responds to the CPD request message.

The convergence device 30 may be configured to receive, by using the pkt-mm-2 interface, the first resource reservation request message sent by the foregoing PS 20, and obtain, by means of parsing, the resource reservation request included in the first resource reservation request message; and is configured to convert the foregoing first resource reservation request message into the second resource reservation request message, and send the second resource reservation request message to the CMTS 401.

The CMTS 401 is connected to the foregoing convergence device 30, and is configured to receive the foregoing second resource reservation request message by using the pkt-mm-2' interface, obtain, by means of parsing, the resource reservation request included in the second resource reservation request message; and is configured to control a service flow by using a control message, to respond to the foregoing resource reservation request, which is specifically to control addition, change, or deletion of a dynamic service flow between the CMTS 401 and the CM 402 by using a DSX message, to respond to the foregoing resource reservation request.

Further, after a requirement of the foregoing resource reservation request is met, the CMTS 401 is further configured to send a first resource reservation response message to the convergence device 30.

Further, the convergence device 30 is further configured to receive the foregoing first resource reservation response message, convert the foregoing first resource reservation response message into a second resource reservation response message, and send the second resource reservation response message to the PS 20.

Further, the PS 20 is further configured to receive the foregoing second resource reservation response message, convert the second resource reservation response message into a third resource reservation response message, and send the third resource reservation response message to the AM.

Further, the AM is further configured to receive the foregoing third resource reservation response message, and may send a response message for the foregoing request message related to the session to the subscriber end 50 by using the P-CSCF as required.

Optionally, a form of the foregoing resource reservation request message is a Gate-Set message, and a form of the foregoing resource reservation response message is a Gate-Set-Ack message.

Specifically, when the foregoing request message related to the session is a session establishment request message, the foregoing control message (the DSX message) is a DSA message, that is, the CMTS 401 is configured to control, by using the DSA message, addition of a dynamic service flow between the CMTS 40 and the CM 50. Specifically, as shown in FIG. 7, a procedure of the addition may include: sending, by the CMTS 401, a request message DSA-REQ to the CM 402 to request addition of a dynamic service flow; adding, by the CM 402, a dynamic service flow according to the request, and returning a response message DSA-RSP to the CMTS 401; and returning, by the CMTS 401 after receiving the response message DSA-RSP, an acknowledgement message DSA-ACK; therefore, a corresponding dynamic service flow is successfully added.

Further, referring to FIG. 10, the CMTS 401 may be further configured to determine whether an available bandwidth resource between the CMTS 401 and the foregoing CM 402 can meet the foregoing resource reservation request, and if no, the CMTS 401 sends the foregoing convergence device 30 a message (a Gate-Set-Error message) indicating failure in resource reservation. As shown in FIG. 11, the Gate-Set-Error message may be forwarded to the AM by using the convergence device 30 and the PS 20, and after receiving the Gate-Set-Error message, the AM may notify, by using the P-CSCF, the subscriber end 50 of the failure in the resource reservation performed for the session.

Further, the RME module 302 may be further configured to determine whether an available bandwidth resource between the convergence device 30 and the CMTS 401 can meet the foregoing resource reservation request, and if no, the convergence device 30 sends the message (a Gate-Set-Error message) indicating the failure in the resource reservation to the foregoing PS 20. As shown in FIG. 9, the Gate-Set-Error message is forwarded to the AM by using the PS 20, and after receiving the Gate-Set-Error message, the AM notifies, by using the P-CSCF, the subscriber end 50 of the failure in the resource reservation performed for the session.

Optionally, the resource reservation system provided in this embodiment, under the C-DOCSIS system architecture, may be further configured to execute the procedure described in any embodiment of method embodiment 1 to method embodiment 5. For roles, played in the procedure, of devices or function entities in the resource reservation system, reference may be made to method embodiment 1 to method embodiment 5, and details are not described herein again.

It should be noted that, the foregoing Gate-Set-Error message is the message indicating the failure in the resource reservation.

It can be understood that, in the foregoing embodiments, a Gate-Set message is used to represent a request message or an activation message, sent by an AM in a downlink direction, for adding a dynamic service flow, a Gate-Set-ACK message is used to represent an acknowledgement message that is sent by a CMTS in an uplink way after the dynamic service flow is added or activated successfully, a Gate-Set-Error message is used to represent a message that indicates failure in resource reservation and that is sent in an uplink way by the CMTS or a convergence device after the dynamic service flow fails to be added or activated. In the foregoing embodiments, some other message forms are also used, such as, a Gate-Delete message, a DSA message, a DSC message, and a DSD message. It should be noted that, the foregoing message forms are selected only in this embodiment, a person of ordinary skill in the art may also select another message form that can implement a same function or role, and equivalent replacements that are made by a person of ordinary skill in the art to the foregoing message forms according to the content of the present invention all fall within the protection scope of the present invention.

Persons of ordinary skill in the art may understand that all or a part of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, an optical disk, or the like.

What is claimed is:

1. A resource reservation method, comprising:
   receiving, by a convergence device, a first resource reservation request message based on a format of a first interface and the first resource reservation request message is from a policy server (PS);

converting, by the convergence device, the first resource reservation request message into a second resource reservation request message based on a format of a second interface;

sending, by the convergence device, the second resource reservation request message that is based on the format of the second interface to a modulation and demodulation system, so that the modulation and demodulation system performs a resource reservation according to the second resource reservation request message;

receiving, by the convergence device, a first resource reservation response message from the modulation and demodulation system by using the second interface;

parsing, by the convergence device, the first resource reservation response message, and generating a second resource reservation response message according to a result of the parsing;

sending, by the convergence device, the second resource reservation response message to the PS by using the first interface;

receiving, by the convergence device, a first resource activation request message based on the format of the first interface and from the PS;

converting, by the convergence device, the first resource activation request message into a second resource activation request message based on the format of the second interface;

sending, by the convergence device, the second resource activation request message based on the format of the second interface to the modulation and demodulation system, so that the modulation and demodulation system performs a resource activation according to the second resource activation request message;

receiving, by the convergence device, a first resource activation response message from the modulation and demodulation system by using the second interface;

parsing, by the convergence device, the first resource activation response message, and generating a second resource activation response message according to a result of the parsing; and sending, by the convergence device, the second resource activation response message to the PS by using the first interface.

2. The method according to claim 1, wherein the format of the first interface is pkt-mm-2, and the format of the second interface is pkt-mm-2'.

3. The method according to claim 1, wherein after receiving, by the convergence device, the first resource reservation request message that is based on the format of the first interface, the method further comprises:

parsing the first resource reservation request message; and
performing a resource reservation according to the first resource reservation request message.

4. The method according to claim 1, wherein the modulation and demodulation system comprises:

a cable television media converter (CMC) and a cable modem (CM), or a cable modem terminal system (CMTS) and a CM, wherein the CM is connected to at least one subscriber terminal.

5. The method according to claim 4, wherein before receiving, by the convergence device, the first resource reservation request message that is based on the format of the first interface and that is from the policy server (PS), the method further comprises:

relaying, by the convergence device, a Dynamic Host Configuration Protocol (DHCP) packet of the subscriber terminal, and acquiring a correspondence between the subscriber terminal and the CMTS from the DHCP packet, or acquiring a correspondence between the subscriber terminal and the CMC from the DHCP packet; and
sending the correspondence to the PS.

6. A resource reservation system, comprising:

a policy server (PS), a convergence device, and a modulation and demodulation system, wherein the convergence device is connected to the PS by using a first interface, and the convergence device is connected to the modulation and demodulation system by using a second interface;

wherein the convergence device is configured to:
receive a first resource reservation request message from the PS by using the first interface,
convert the first resource reservation request message into a second resource reservation request message based on a format of the second interface,
parse the first resource reservation request message, and perform a resource reservation according to the first resource reservation request message,
receive a first resource activation request message based on the format of the first interface and the first resource activation request message is from the PS,
convert the first resource activation request message into a second resource activation request message based on the format of the second interface,
send the second resource activation request message based on the format of the second interface to the modulation and demodulation system, and
send the second resource reservation request message to the modulation and demodulation system by using the second interface; and the modulation and demodulation system is configured to:
perform a resource reservation according to the second resource reservation request message, and
perform resource activation according to the second resource activation request message.

7. The system according to claim 6, wherein the modulation and demodulation system comprises:

a cable television media converter (CMC) and a cable modem (CM), or a cable modem terminal system (CMTS) and a CM, wherein the CM is connected to at least one subscriber terminal.

8. The system according to claim 7, wherein:

the CMTS or the CMC is configured to:
receive the second resource reservation request message, instruct, by using a pkt-mm-1 interface, the connected CM to add a service flow, and reserve a resource.

9. The system according to claim 7, wherein the convergence device is further configured to:

relay a DHCP packet of the subscriber terminal, and acquire a correspondence between the subscriber terminal and the CMTS from the DHCP packet, or acquire a correspondence between the subscriber terminal and the CMC from the DHCP packet; and
send the correspondence to the PS by using a pkt-qos-2 interface.

10. A convergence device, comprising:

a first interface, configured to receive a first resource reservation request message from a policy server (PS);
a dynamic quality of service (DQoS) proxy module, configured to convert the first resource reservation request message based on a format of the first interface into a second resource reservation request message based on a format of a second interface; wherein:
the second interface is configured to send the second resource reservation request message to a modulation and demodulation system, so that the modulation and demodulation system performs resource reservation according to the second resource reservation request message;
the first interface is further configured to receive a first resource activation request message from the PS;
the DQoS proxy module is configured to convert the first resource activation request message based on the format of the first interface into a second resource activation request message based on the format of the second interface; and
the second interface is further configured to send the second resource activation request message to the modulation and demodulation system, so that the modulation and demodulation system performs resource activation according to the second resource activation request message; and
a resource management entity (RME) module, configured to parse the first resource reservation request message and perform resource reservation according to the first resource reservation request message.

11. The convergence device according to claim 10, wherein the format of the first interface is pkt-mm-2, and the format of the second interface is pkt-mm-2'.

* * * * *